Aug. 22, 1933.   H. J. BLUM   1,923,183
FILAMENT SPINNING APPARATUS
Filed Jan. 26, 1932   9 Sheets-Sheet 1
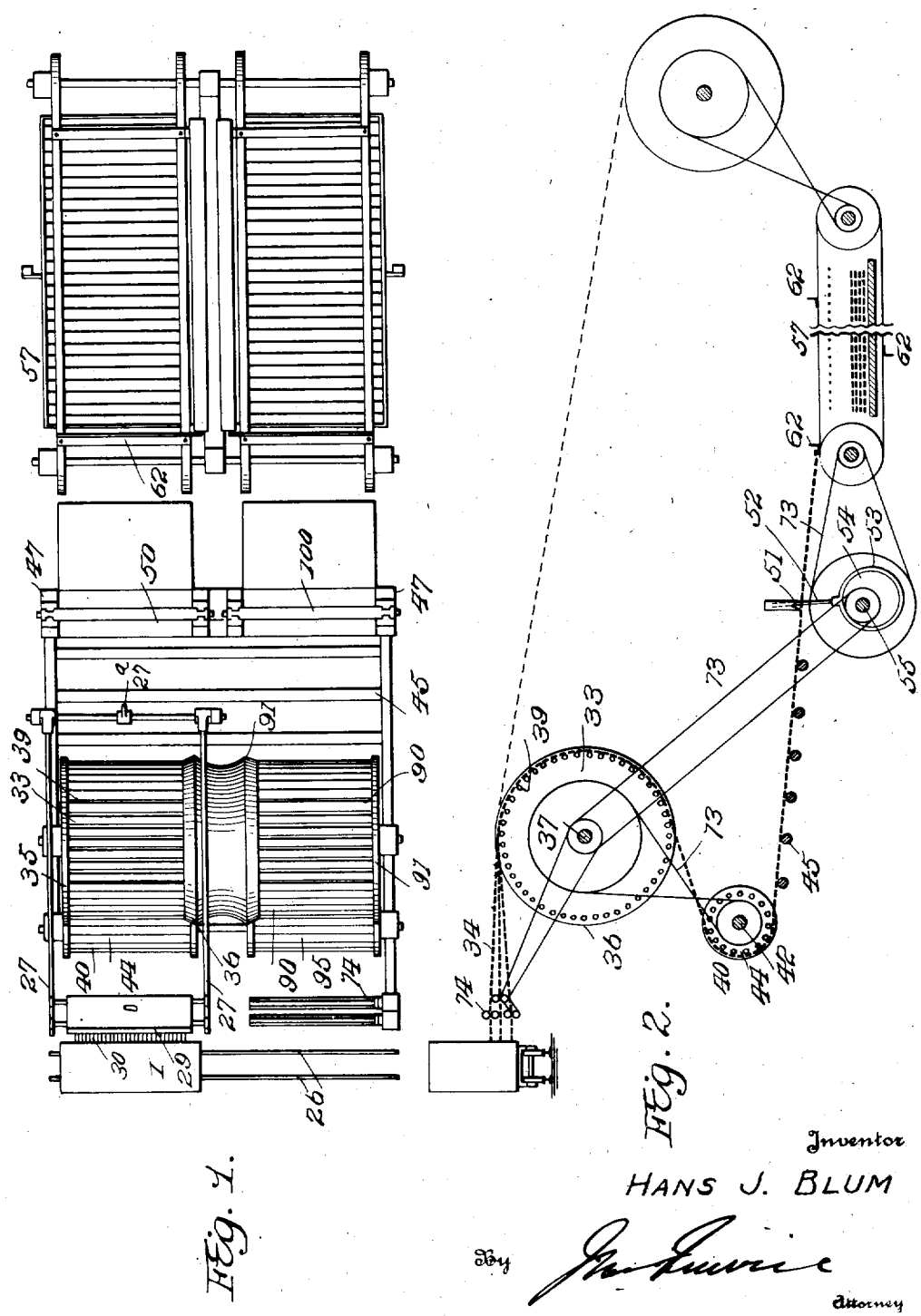
Inventor
HANS J. BLUM
By
Attorney

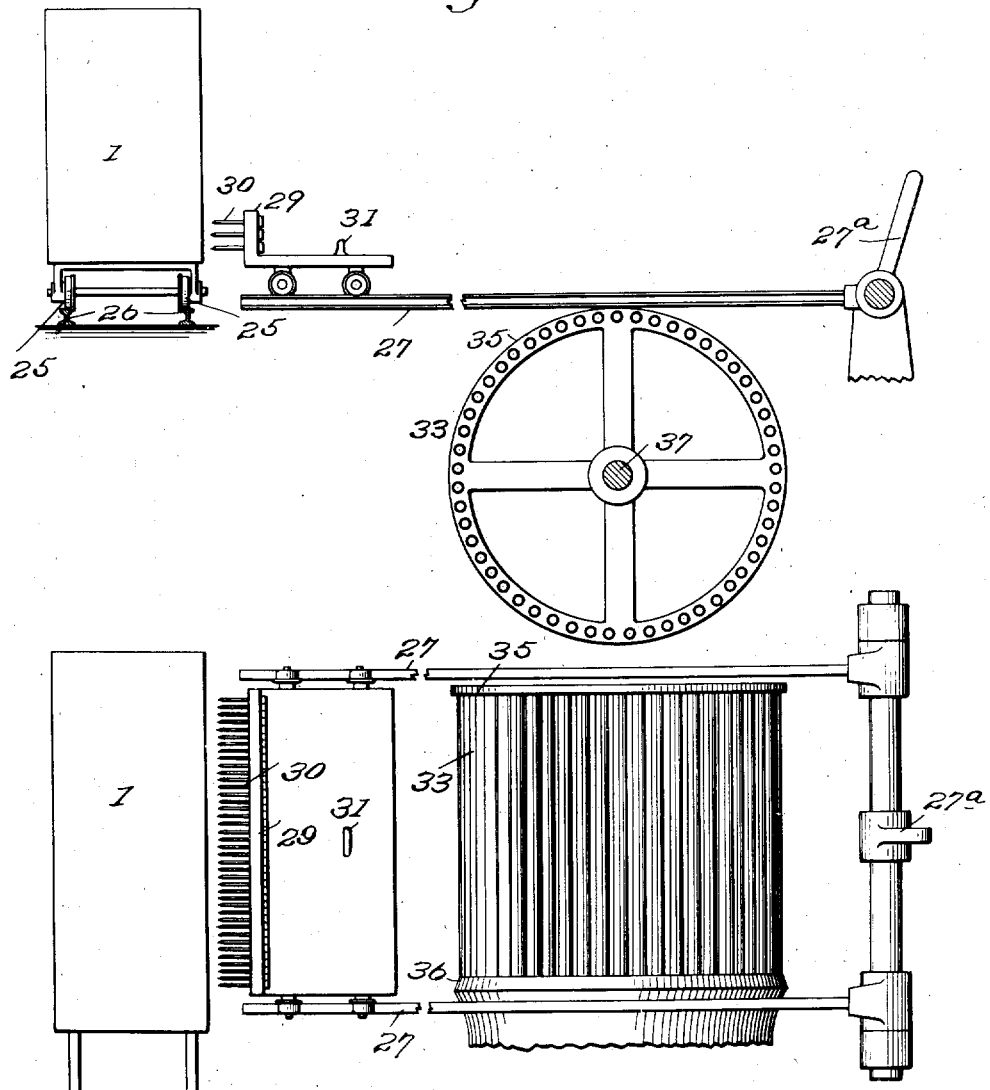

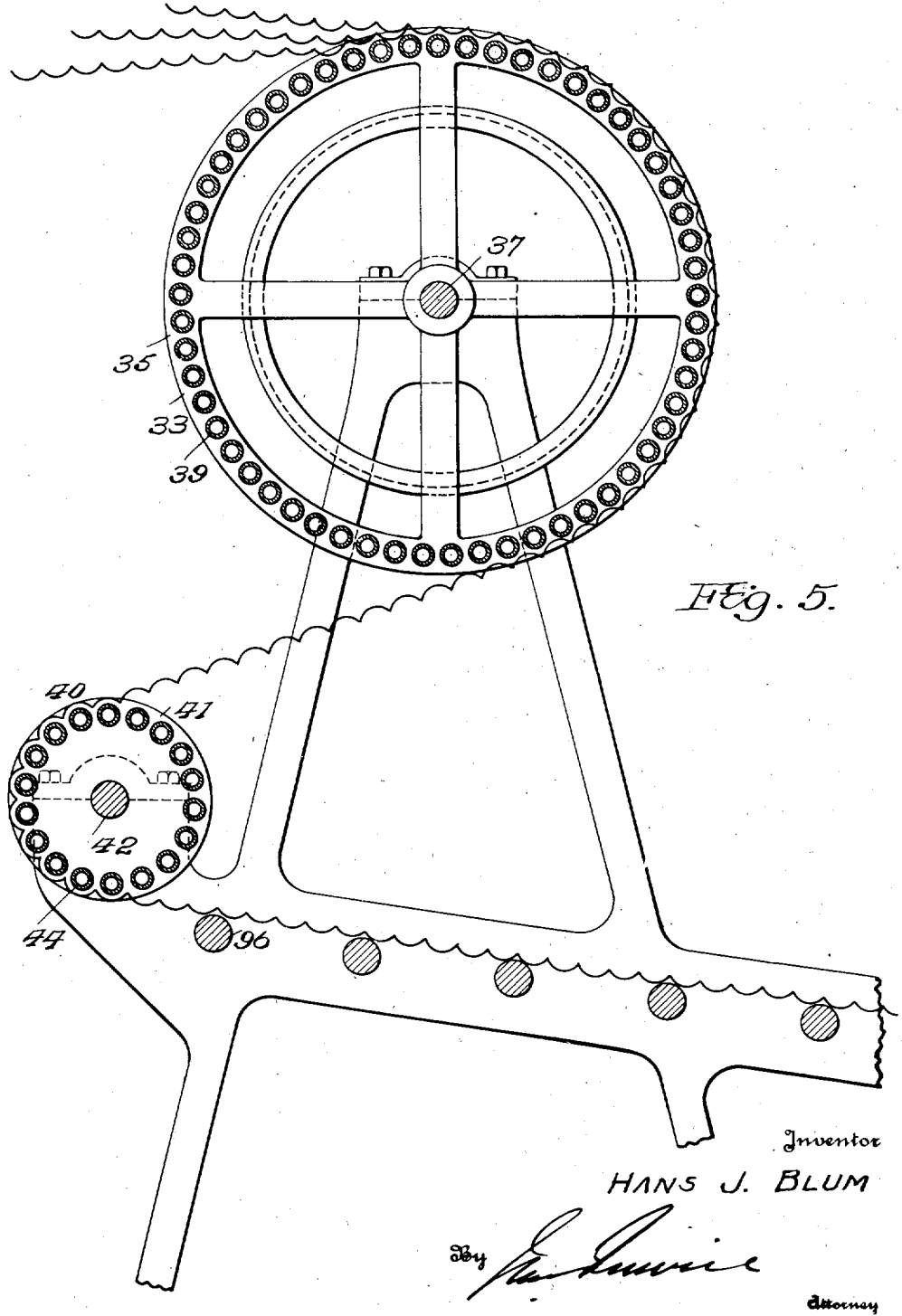

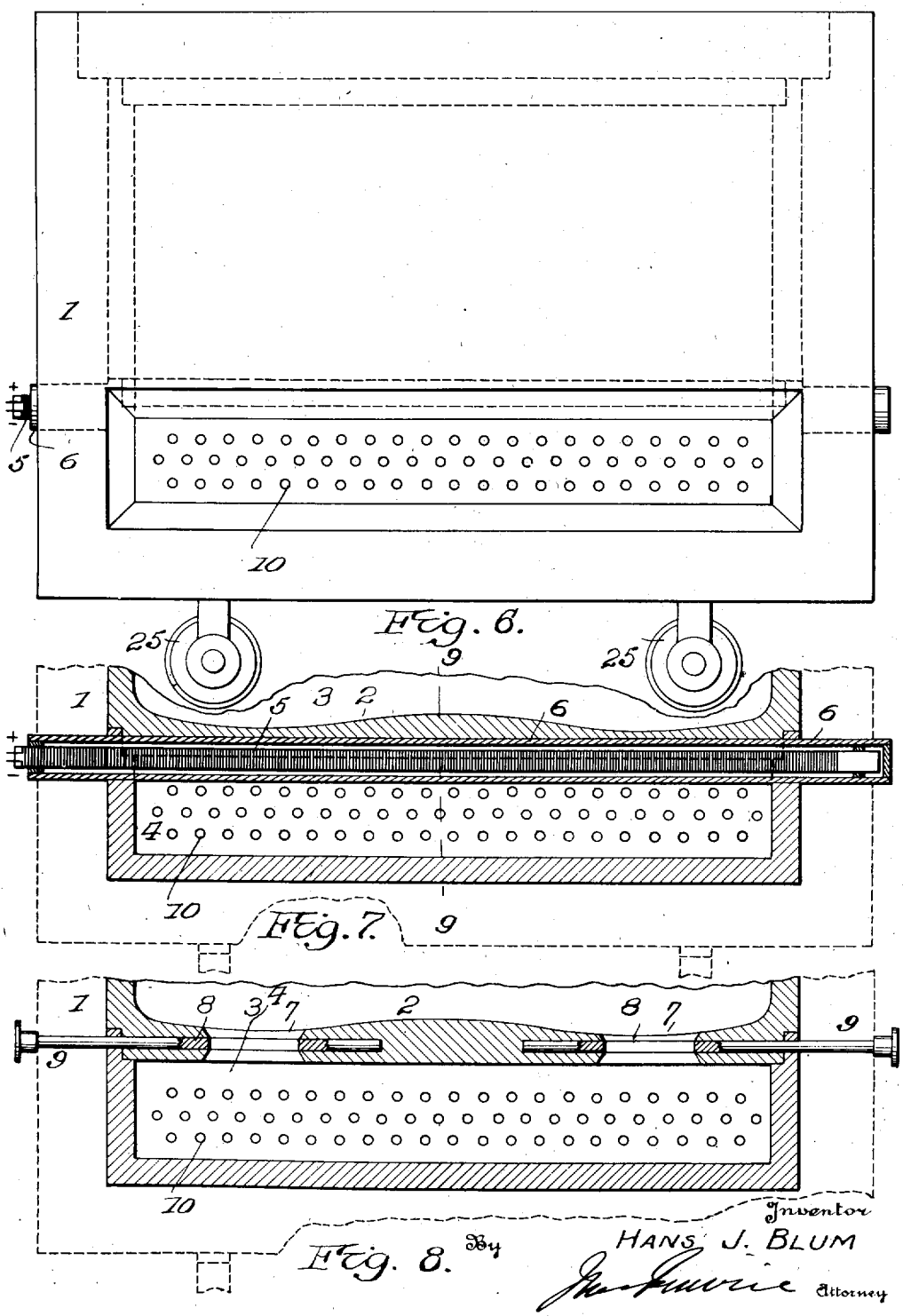

Aug. 22, 1933.   H. J. BLUM   1,923,183
FILAMENT SPINNING APPARATUS
Filed Jan. 26, 1932   9 Sheets-Sheet 5
Fig. 9.
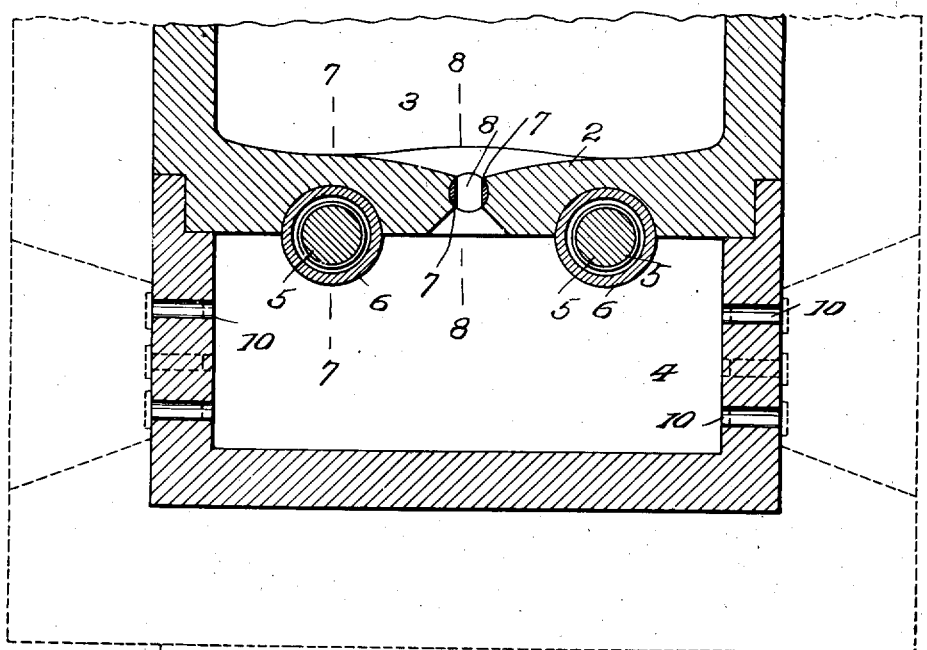
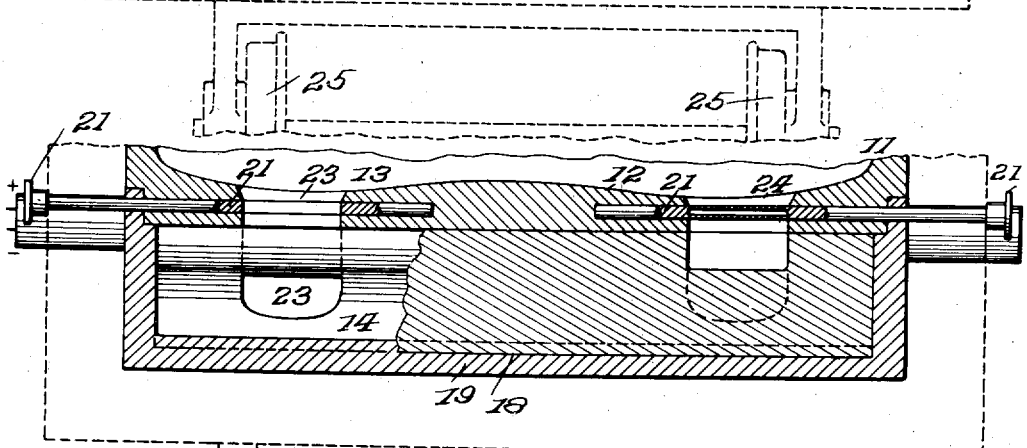
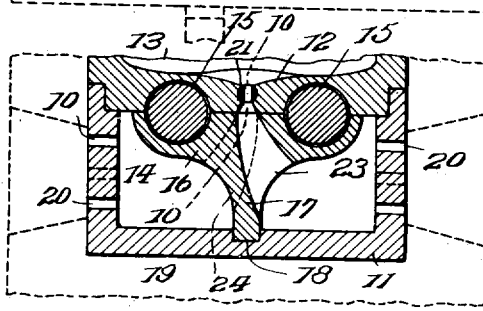
Fig. 10.
Fig. 11.
Inventor
HANS J. BLUM
Attorney Aug. 22, 1933.  H. J. BLUM  1,923,183
FILAMENT SPINNING APPARATUS
Filed Jan. 26, 1932   9 Sheets-Sheet 6
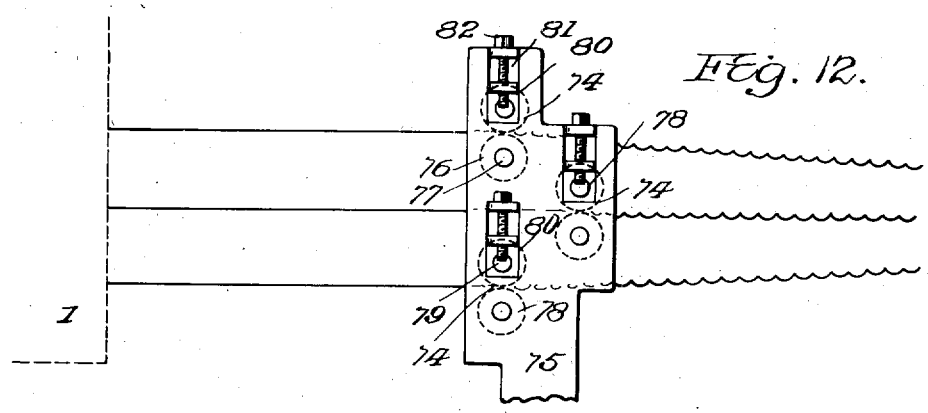
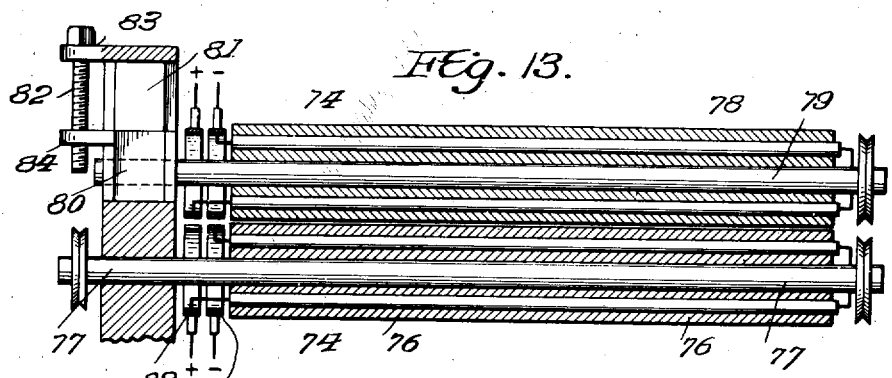
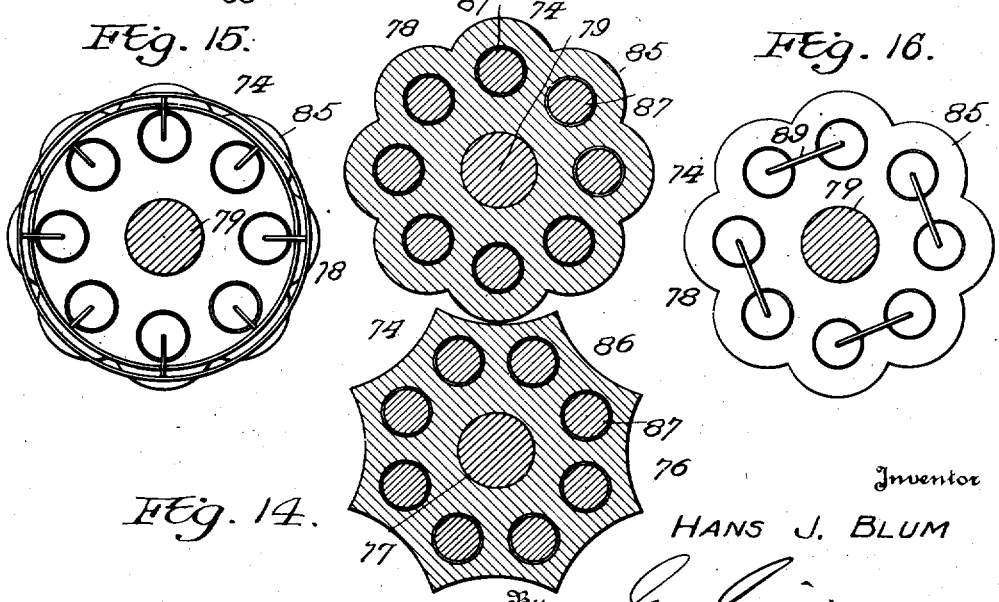
Inventor
HANS J. BLUM

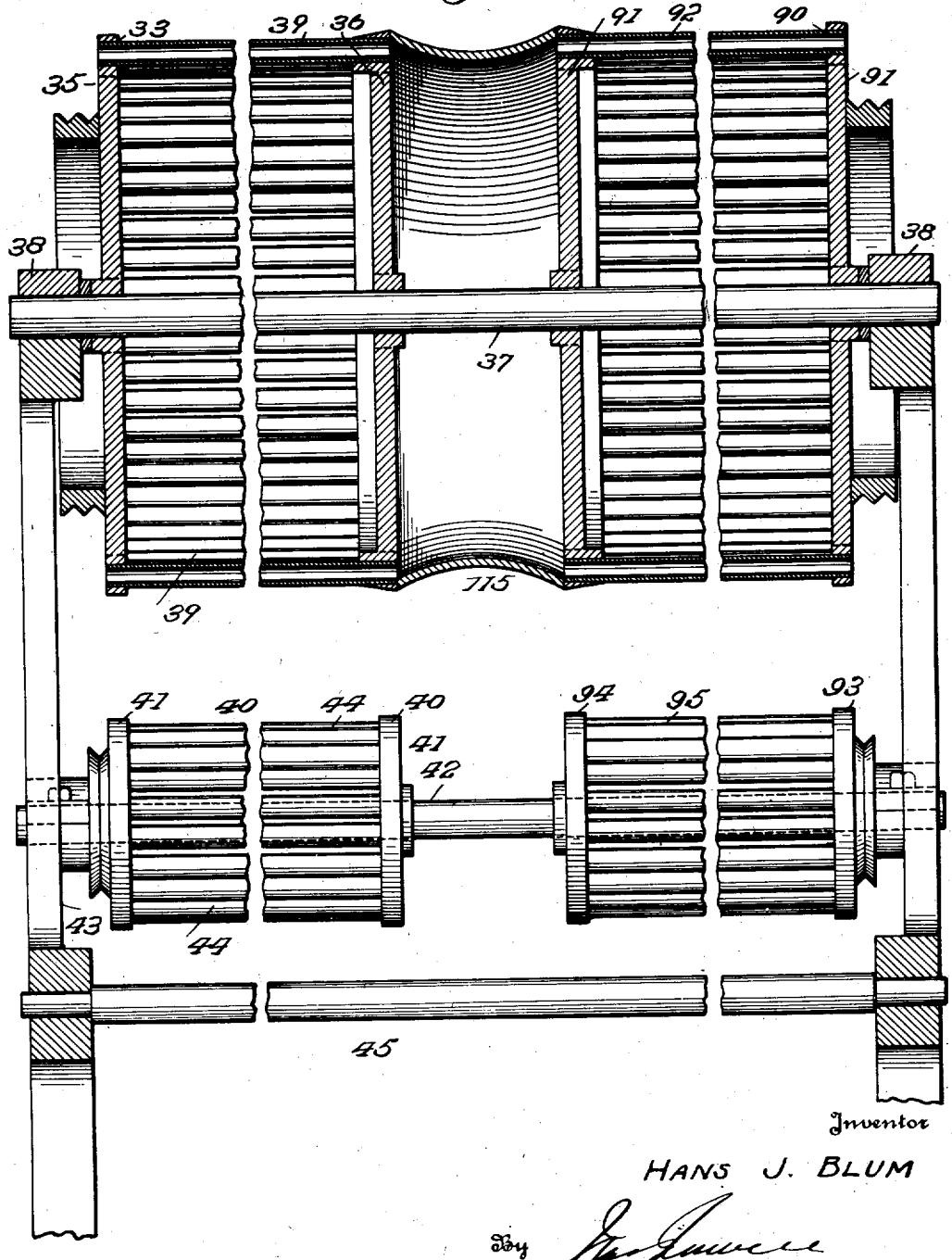

Inventor
HANS J. BLUM
By [signature]
Attorney

Aug. 22, 1933. H. J. BLUM 1,923,183
FILAMENT SPINNING APPARATUS
Filed Jan. 26, 1932 9 Sheets-Sheet 9
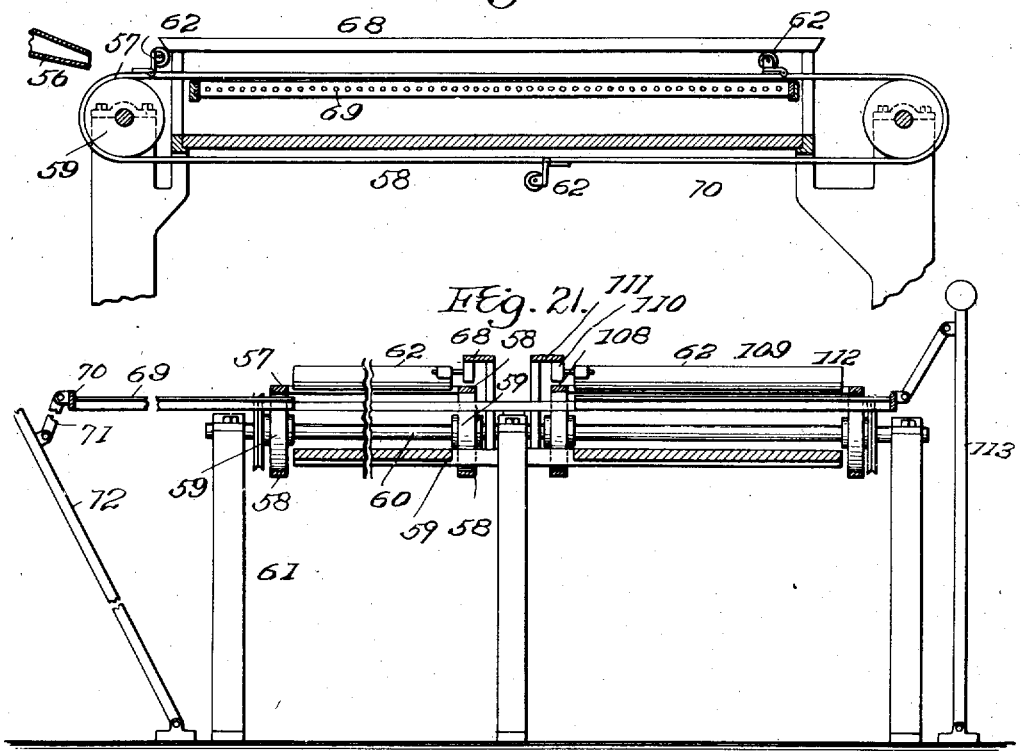
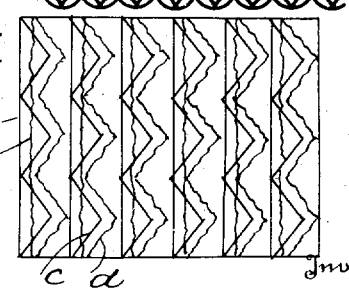
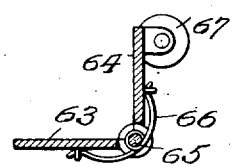
Inventor
HANS J. BLUM
By
Attorney Patented Aug. 22, 1933

1,923,183

UNITED STATES PATENT OFFICE 1,923,183

FILAMENT SPINNING APPARATUS

Hans J. Blum, New York, N. Y.

Application January 26, 1932. Serial No. 589,025

20 Claims. (Cl. 49—17)

This invention is directed to a method and means of producing spun glass filaments, particularly with a view to utilizing such filaments for the manufacture of insulating sheets or bodies, or filtering, etc.

The effective use of spun glass, particularly in connection with the manufacture of insulating bodies or sheets, is dependent largely upon the dead air space provided by the filaments and filament layers, and the provision of dead air spaces is dependent more or less upon the orderly arrangement of the filaments of each layer and the relative disposition of the layers, as the indiscriminate grouping of the filaments as heretofore proposed ordinarily results in an insulating sheet or body in which the insulating efficiency is not uniform throughout the body, with the resultant necessity of unnecessarily thick and unwieldy masses and the use of an unnecessarily large proportion of spun glass.

The present invention has for its primary object a method of spinning the glass from the molten mass and the disposition of the filaments in orderly arrangement and layers for proper relative disposition in the insulating body being constructed.

A further object of the invention is the method of treating the individual filaments during the spinning operation to materially increase the number and area of the dead air spaces in the resultant insulating body without increasing either the number of layers or the quantity of filaments employed, to thereby very materially increase the insulating effect of the resultant body without increasing its thickness or weight.

A further object of the invention is the provision of a machine constructed with a view to spinning the filaments in a plurality of independent filament forms maintained in layer relation, and dividing the filaments of a particular layer simultaneously for delivery as a layer for use in manufacturing the insulating body, the apparatus providing for the substantially uninterrupted automatic handling of the filaments to insure uniformity in final layer arrangement.

A further object of the invention is the provision of a machine capable of selective operation for the production of filaments of substantially plain, thread-like form or for the formation of filaments of undulating or crimped form, the apparatus being constructed to spin either type of filament or both and to handle both types alone or similarly in connection with each other with respect to layer formation and layer deposit.

A particularly essential object of the present invention is the provision of means by which the filament is subjected to a treatment in which the filament is formed in a wavy or convolute shape and in which a series of these filaments in layer form are severed in a particular manner and in particular lengths for use, the particular severing of the filaments being so arranged that when the filaments of one layer are deposited upon the filaments of a preceding layer, the convolutions or undulations of the filaments of one layer are out of line with the corresponding formations of the filaments of a preceding layer, whereby the maximum dead air space area is formed throughout the mass made up of a series of such layers or two different kinds of filaments are intermixed.

A further object of the invention is the provision of means by which glass material may be automatically withdrawn from the furnace in the initial formation of the filaments and automatically delivered for spinning, with the result of insuring certainty in the number of filaments utilized in a particular layer and materially reducing the time and labor required to initially connect such filaments to the spinning wheel.

A further object of the invention is the provision of means by which the filaments, when automatically withdrawn from the furnace, are initially delivered for straight or plain spinning, with the parts of the apparatus arranged to permit convenient transfer of the filaments without interruption of the spinning operation from the apparatus for plain spinning to the apparatus for imparting an undulating or wavy form to the filaments.

The invention is illustrated in the accompanying drawings, wherein:—

Figure 1 is a diagrammatic plan view of the improved apparatus.

Figure 2 is a diagrammatic side elevation of the same.

Figure 3 is a side elevation showing the carriage for the automatic initiation of the filament spinning.

Figure 4 is a plan view showing the carriage, furnace and spinning wheel, the carriage being shown in substantially operative relation to the furnace.

Figure 5 is an enlarged elevation of the spinning wheel, feeding wheel and guide rollers for the filament.

Figure 6 is a front elevation of the furnace.

Figure 7 is a broken vertical section of the same on the line 7—7 of Figure 9, showing more particularly the means for maintaining the glass in a molten condition.

Figure 8 is a broken vertical sectional view of the furnace on the line 8—8 of Figure 9, showing the means for controlling the admission of molten glass to the drawing chamber of the furnace.

Figure 9 is a broken vertical sectional view of the furnace on the line 9—9 of Figure 6.

Figure 10 is a section taken at right angles to Figure 9 on the line 10—10 of Figure 11, showing more particularly the means for controlling the flow of molten glass to the respective chambers of a modified form of furnace.

Figure 11 is a broken section on a somewhat reduced scale taken at right angles to the line of section of Fig. 10.

Figure 12 is a view in broken elevation, more or less diagrammatic, showing the relation of the fluting rolls to the furnace.

Figure 13 is a longitudinal section through a cooperating pair of fluting rolls.

Figure 14 is an enlarged vertical section through a cooperating pair of fluting rolls, the section being taken at right angles to that of Figure 13 and the rolls materially enlarged.

Figure 15 is an end view of one of the rolls.

Figure 16 is an opposite end view of the same roll.

Figure 17 is a vertical sectional view, partly in elevation, showing the spinning rolls and feed rolls of the apparatus, indicating particularly their correlation to provide for the transfer of filament formation from straight filament form to crimped form.

Figure 20 is a side elevation, partly in section, of the conveyor to which the respective layers of spun glass filaments are deposited in superimposed relation.

Figure 21 is a transverse section of the same.

Figure 22 is an enlarged sectional view showing the clamping means for the filaments for holding the filaments on and moving them with the conveyor.

Figure 23 is a diagrammatic view illustrating the disposition of several superimposed layers making up an insulating section or sheet and illustrating more particularly the offset relation of the undulating sections of the filaments to provide maximum dead air space.

Figure 24 is a similar view showing another way of superimposing the layers.

Figure 25 is a plan of another way of superimposing the layers.

Figure 18:
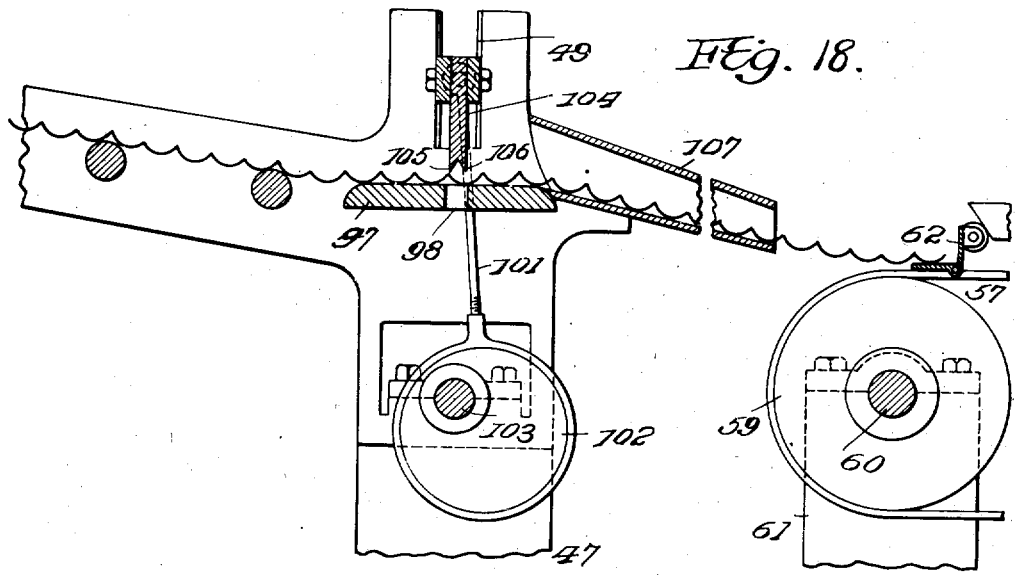
Figure 18 is a vertical sectional view illustrating particularly the means for cutting the filaments of a layer into proper lengths during the automatic operation of the apparatus.
Figure 19:
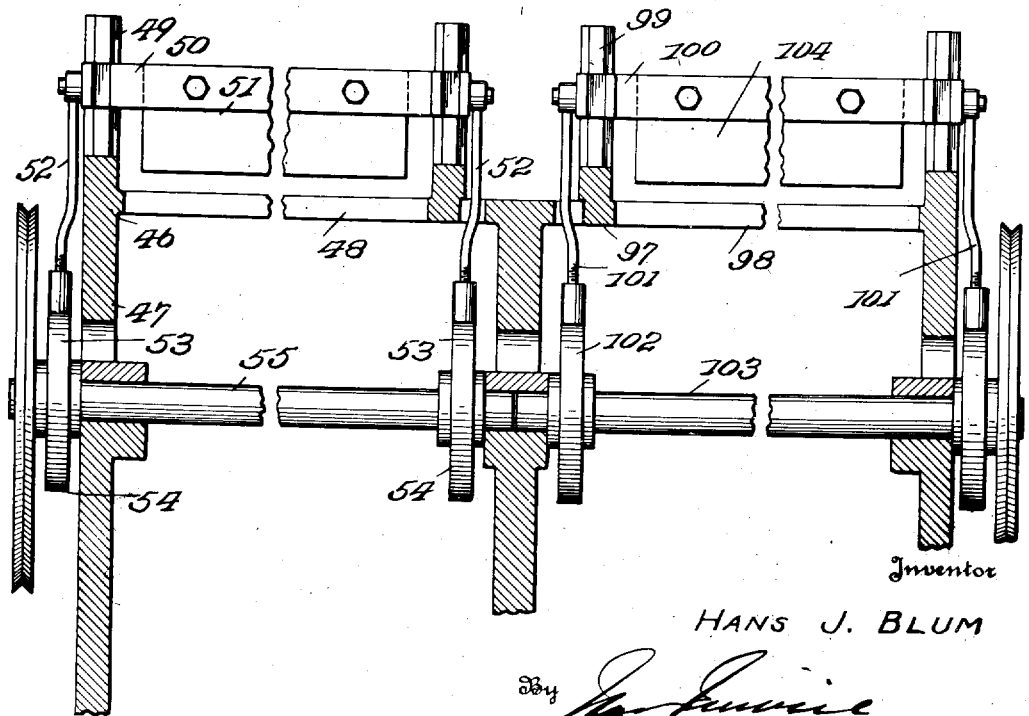
Figure 19 is a front elevation of the same.

Glass spinning apparatus as heretofore constructed involves generally the provision of a furnace in which the glass is heated to and maintained in a particular molten condition, the furnace being provided with a series of comparatively small outlets which permit the glass to be withdrawn in fine filament form. The filaments withdrawn from the furnace in any selected number are usually connected to a revolving spinning wheel on which the filaments are grouped and on which they are ordinarily spun to arrange a number of superimposed layers of filaments, following which the filament operation is stopped, the accumulated layers on the wheel divided and stripped from the wheel for use in connection with the manufacture of insulating sections or bodies.

The furnace for the molten material, which is shown more particularly in Figures 6 to 11, comprises a body 1 of appropriate refractory material, divided by a partition 2 into an upper chamber 3 and a lower chamber 4. The glass or material delivered in any form to the upper chamber is heated to a more or less molten condition and then delivered to the lower chamber, where it is brought to that more or less exact fluid condition best adapted for the spinning operation.

To provide for heating the glass in the upper chamber so that it will flow to the lower chamber, and also for maintaining the condition of the glass in the lower chamber at the exactly required degree of heat, the furnace is provided with a plurality of heating elements 5, which may be of any desired form or construction appropriate to the use for which they are intended. These heating elements, here shown as electrically energized, are preferably removably seated in a tubular receiver 6, through which the heat from the heating elements is delivered through the partition 2 to the glass in the upper chamber and through which the heat of the heating elements is directly delivered to the molten mass in the lower chamber. Of course, it is to be understood that the heating elements are in appropriate number and capacity to secure the desired result, and aside from this requirement and from the fact that the tube 6 must be of a material unaffected by the molten glass, the invention contemplates the use of any required heating agency for the purpose, as, for instance, natural gas, etc.

The upper chamber 3 communicates with the lower chamber 4 through openings 7 controlled by gates 8 manually and selectively operated from the exterior of the furnace, as by members 9, providing for the delivery of the molten metal from either end of the upper chamber 3 to the lower chamber. The side walls of the lower chamber are formed with a plurality of openings 10 arranged in more or less regular order and in rows longitudinally of the furnace. The respective side walls are formed with the openings 10 so that the molten glass may be drawn in filament form from either or both sides of the furnace.

It is to be particularly noted that the chamber 4, the side walls of which are formed with the outlet openings 10, is open to a more direct heat from the heating elements than is the chamber 3, so that the material in the chamber 4, which will be hereinafer referred to as the drawing chamber, may be readily subjected to that degree of heat most effective for the withdrawal of the glass in filament form.

In Figure 9, the furnace body is shown in transverse section through one of the gates, in which it will be seen that the gates are located in the longitudinal central plane of the body adjacent the respective sides and effectively control delivery to the drawing chamber. This figure also illustrates the relation of the heating elements to the drawing chamber, showing the more effective utilization of the heat in the drawing chamber than in the upper or melting chamber.

In Figures 10 and 11, a slightly modified form of furnace is shown, in which the furnace body proper, indicated at 11, is divided by a partition 12 into an upper melting chamber 13 and a lower drawing chamber 14. In this form, the heating elements, preferably electrical and indicated at 15, are seated in semi-cylindrical openings formed in the partition 12 and in complementary semi-cylindrical openings formed in a removable partition wall 16 which has a depending central section 17 removably seated in a depression 18 in the bottom wall 19 of the furnace. The removable partition 16 divides the drawing chamber longitudinally into two independent chambers, the outer side walls of which are formed with drawing outlets or openings 20.

The partition 12 of the modified form is provided with the gates 21 controlled at 22. The openings controlled by these gates open in passages 23 and 24 respectively leading through the section 17 of the partition 16 and opening at their lower ends into the respective drawing chambers. Thus the molten metal of the melting chamber may be delivered into either or both of the lower or drawing chambers at will. In this form of furnace, the protecting refractory tubes 6 of the preferred form are unnecessary, as the removable partition 16 serves to effectively protect the heating elements, as will be plain from Figure 11.

In order to adapt the apparatus for spinning straight filaments or corrugated filaments at will, longitudinal shifting of the furnace is important, as will later appear, and for this purpose the furnace of either form is mounted upon rollers 25 in appropriate number and size designed for travel on track rails 26, shown more particularly in Figures 3 and 4. In apparatus of this type as generally heretofore composed, it has been customary for the operator to draw the filaments singly from the drawing outlets of the furnace through the medium of a glass rod or the like introduced into the opening and substantially fused to the molten glass and then withdrawn through the opening, followed by the thin film or filament of glass. This single filament is then deposited on the spinning wheel and the operation repeated until the desired number of filaments have been led from the furnace to the spinning wheel, whereupon the spinning operation is started. The necessity for individually withdrawing the filaments from the furnace is a matter of considerable labor and time.

The present invention contemplates the simultaneous withdrawing from the furnace of the selected number of filaments for the particular purpose in a mechanical and automatic manner. For this purpose, there is arranged at one or both sides of the furnace a trackway including spaced rails 27 which terminate in a level section immediately behind the spinning wheel and to be lifted upwardly. The carriage 28 is mounted for travel on the track 27, this carriage including an upright forward wall 29 formed to receive a plurality of drawing elements 30. That is to say, the wall 29 is formed with openings in which the elements 30 may be removably inserted and frictionally held in any requisite number in order to provide for drawing the requisite number of filaments from the furnace. The carriage 28 is provided with an eye 31 designed to be used as a handle to pull the carriage to the end of the track behind the wheel, a lever 27a being employed to lift the track and carriage to clear the space between furnace and wheel. The drawing implements 30 of the carriage are designed to be inserted in the appropriate outlet openings 10 of the furnace, it being understood that the disposition of the trackway and the arrangement of the drawing elements permit this application of such elements conveniently when the carriage is at its lowermost position.

When the molten glass is at the proper temperature for drawing, the carriage is moved outwardly along the trackway 27, and as the drawing implements 30 are of a character to fuse with and draw out the molten glass, the movement of the carriage is followed by the filament from each of the selected outlets 10, with, of course, a filament connected to each of the selected drawing implements 30. A spinning wheel, indicated at 33 and more particularly described hereinafter, is arranged in the path of the filaments indicated at 34 and allowed to follow the carriage. The filaments between the carriage and furnace will, by their own weight, move into contact with the spinning wheel 33, and as the filaments are at this time more or less highly heated, there is a tendency for the filaments to adhere to the spinning wheel, and following such adhering contact with the spinning wheel the filaments between the spinning wheel and carriage are broken away or cut and the spinning wheel operated for the continued withdrawing of the filaments from the furnace. If desired, a film of water or other liquid on the spinning wheel may be used to assist in insuring adherence of the filaments to the wheel, and in the event any one or more filaments do not follow the particular withdrawing implements 30 or are broken from such implements during movement of the carriage, the conventional single tool may be introduced into the particular outlet opening of the furnace and the missing filament or filaments applied directly to the spinning wheel in an obvious manner.

The spinning wheel 33 is shown more particularly in Figures 5 and 17, and comprises spaced plates 35 and 36 mounted for free rotation on a shaft 37 supported in frame bearings 38, the plates 35 and 36 being connected rigidly together for simultaneous movement. The plates 35 and 36 are spaced apart and connected by a series of freely rotatable or fixed, hollow or solid, pipe-like elements 39 disposed in a circumferential series immediately adjacent the peripheries of the disks. These pipe-like elements are spaced apart circumferentially of the spinning wheel and each is mounted for independent free rotation on the wheel or if desired they may be in the form of fixed bars. As the spinning wheel 33 is designed for the spinning of straight filaments, the use of the independent, hollow, rod-like supports for the filaments is not particularly important in this wheel, and while such a construction is of importance in spinning corrugated or crimped filaments, the use of the independent, rotatable, rod-like supports on the wheel 33 are contemplated. Of course, the surface receiving the filaments in this straight filament spinning wheel 33 may be otherwise formed in any conventional manner and may, if desired, have a series of annular depressions in the surface of the wheel in which the filaments are received. Therefore, while it is preferred that the wheel 33 be constructed as described, it is to be understood that any contemplated character of surface for this wheel may be used without in any way interfering with the function of the wheel for spinning straight filaments.

Below the spinning wheel 33 is a take-off feed roller 40 including disk heads 41 connected for unitary movement and rotatable on a shaft 42 supported in frame bearings 43. This take-off roller 40 being designed for the spinning of straight filaments may have a surface appropriate with any selected or preferred surface on the spinning wheel 33, though as the apparatus contemplates a take-off roller for use in connection with corrugated or crimped filaments, it is preferred that this take-off roller 40 be provided with an annular series of freely rotatable hollow bars or rods 44 arranged in an annular series adjacent the periphery of the disks 41. The relation of the spinning wheel and the take-off roller is shown more particularly in Figure 2.

The wheels may be so arranged that they have a sidewise movement from time to time to deposit the filament when not made continuous criss-crossed, as shown in Figure 24. In this showing, the filament deposited with outside movement is indicated at $a$, a superimposed layer of filament of corrugated form and without side movement is indicated at $b$, a superimposed filament of plain or straight type with side movement is indicated at $c$, while a corrugated filament with the lateral or side movement is indicated at $d$. Of course, this arrangement may be varied with regard to the character of the superimposed filaments in their relation one to the other and as many superimposed filaments as desired may be provided. The angular representation of the filaments deposited with the side movement is the result of the permissible side movement of the wheels.

A series of guide rollers 45 appropriately supported on a suitable framing in advance of or after the take-off roller serves as a guiding and supporting means for the filament, the plane of the surfaces of these guide rollers being inclined downwardly from the take-off roller for more convenient feeding. Immediately beyond the final guide roller 45 is arranged a cutting platform 46 supported on the frame uprights 47 and formed with a transverse slot 48. The uprights 47 extend above the platform and are formed to provide guideways 49 to receive and guide the cross bar 50 on which is removably secured a cutter 51 operating in line with the slot 48. The knife is reciprocated through pitmen 52 connected at one end to the terminals of the bar 50 and at the opposite end to a band 53 encircling an eccentric 54 mounted on a shaft 55 supported in the uprights 47. Beyond the cutter platform 46 is arranged a forwardly and downwardly inclined chute 56 leading to a conveyor 57. This conveyor comprises spaced endless belts 58 arranged for travel over rollers 59 supported on shafts 60 mounted on the framework 61. Bridging the space between the belts and connected to each are three or more grippers 62, these grippers being spaced equal distances apart throughout the full length of the belts. The grippers are shown more particularly in Figure 22, and comprise plates 63 secured to and bridging the belts, and gripping plates 64 hingedly connected at 65 to the plates 63 normally held in substantially right angled relation by springs 66.

The plates 64 are provided near their upper free edges with offset rollers 67, and arranged above the upper flight of the conveyor is a cam bar 68 designed to engage with a roller 67 of a gripper at the initial end of the upper flight of the belt and force the plate 64 down onto the plate 63 to grip the leading ends of the filaments and advance the filament in the movement of the belt. At the remote end of the conveyor, the cam plate 68 is interrupted so as to permit the spring 66 to open the plates of the gripper and release the ends of the filaments. If desired and as preferred, the proximate faces of the gripper plates may be covered with felt, asbestos or other appropriate material.

Bridging the space between the belts and on a plane immediately below the upper flight is a series of rods 69 preferably arranged in spaced relation and connected at their ends by longitudinal bars 70 mounted for sliding movement transverse the belt frame and connected through the medium of a link 71 with a hand lever 72, in the operation of which all rods 69 may be withdrawn laterally.

The spinning wheel, take-off roller, knife and conveyor are preferably driven from a single motor by belts and belt wheels, indicated for example at 73, and the relative diameters of the belt wheels and the relation of the belts is such that the various parts are driven in the proper direction and at predetermined relative speeds for a proper control of the filament.

In the use of the apparatus for the delivery of a straight filament, the withdrawing implements 30 of the carriage are inserted in the appropriate outlet openings of the furnace, and when the proper condition of the molten glass in the drawing chamber has been reached, the carriage is moved rearwardly on the tracks 27, passing over spinning wheel 33, and upwardly to the uppermost position, where it is retained by the hook 32. The filament 34 has meanwhile sagged onto the rotating spinning wheel where it is immediately fixed to the wheel by adherence and the apparatus is started. Of course, the filament between the carriage and spinning wheel is broken away, and the spinning wheel making substantially half a revolution with the filament adhering thereto, the forward ends of the filaments are separated from the wheel and advanced to and around the take-off roller 40 over the guide rollers 45, over the cutter platform, and beneath the cutter 51, through the chute 56, and into the first gripper on the conveyor. The apparatus being started, the particular gripper closes upon the ends of the filament, it being understood that such filament is now in a horizontal layer made up of a number of independent filament strands, the number, of course, being selective by a proper arrangement and disposition of the withdrawing elements 30. In this particular, of course, the drawing elements 30 need not be in a horizontal row but may be arranged in several such rows so as to provide a filament layer made up of a comparatively large number of independent filaments.

As the parts continue their operation, the filaments fed from the furnace are drawn over the spinning wheel, beneath the take-up roller, over the guide rolls, over the knife platform, and to the conveyor. As the particular gripper of the conveyor reaches a point approaching the operative end of the upper flight of the conveyor, the knife eccentrics 54 operate the knife to divide the filament. The filament on the conveyor continues to advance, and as the particular cutting gripper reaches the end of the cam bar 68, the grip on the filament is released and the operation has been so timed that at this moment the severed end of that portion of the filament layer is resting upon the cross bars 69. The filament is released and remains on the bars 69, and as the latter are then moved laterally through manual or mechanical operation of the hand lever 72, the bars are withdrawn from beneath the filament and the layer of filament permitted to be deposited bodily upon an appropriate support arranged below the operative flight of the belt. During the interval of release of the filament layer and deposit on the support, the severed end of the following filament is advancing over the cutter platform, through the chute, and onto the conveyor.

The operation is so timed that as the end of the filament reaches the conveyor, the next succeeding gripper rises beneath the end of the filament and past the end and is closed down upon the filament to draw the same lengthwise the conveyor. An appropriate length of this filament is severed as before and the operation is continued, each layer of filament being delivered from the fixed bars of the conveyor onto the support or onto the preceding layers of filament deposited on the support until the filament has been built up to the desired thickness.

The above description and operation defines the production in a substantially automatic manner of an appropriate thickness of spun glass filaments arranged in superimposed layers where the filaments are straight. An important characteristic of the present method and apparatus, however, is the provision of a mass of spun glass filaments of desired thickness, with the filaments arranged in superimposed layers where the filaments are crimped or corrugated lengthwise and where such filaments are arranged in each successive layer with vertically offset corrugations to thereby materially increase the area of the dead air space in any particular mass of the filaments of this character associated in this manner.

It is important in an apparatus of this character that provision be made for spinning the filaments as straight filaments or as corrugated filaments at will in order that the desired type of insulating body or sheet may be provided when desired or necessary without the necessity of complete duplication of all parts. The essential and distinctive difference in those parts of the apparatus designed for the production of the filaments in corrugated form over those designed for the production of the filaments in straight form is the provision of means for imparting the corrugations to the filament and in the necessarily specific formation of the spinning wheel, take-up roller and knife to provide the desired results. Furthermore, the apparatus must be arranged so that the parts utilized in forming the corrugated filaments may be brought into play readily and conveniently and without the expenditure of material, labor or time in the transfer.

To secure this result, there is arranged at one or both sides of the space between furnace and wheel and within the range of the furnace tracks 26, a plurality of sets of fluting or corrugating rollers 74. These rollers are arranged in duplicate pairs in line with and corresponding in number to the horizontal rows of furnace outlets 10 and are supported on a frame upright 75. As stated, each pair is identical and includes a lower roller 76 supported upon a belt-driven shaft 77 mounted at one end in the framework 75 and an upper roller 78 supported on a belt-driven shaft 79 terminally supported in a block 80 slidable in a guideway 81 formed in the frame upright 75, the block, and thereby the upper roller, being vertically adjustable through a screw 82 rotatably supported in an ear 83 fixed to the upright frame 75 and threaded in an ear 84 projecting from the block 80. The mounting supports for the rollers and the means for relatively spacing the rollers vertically are arranged at one end of the rollers, that is, at the end remote from the carriage track 27, the opposite ends of the rollers being wholly free at the start can after be supported in a special bearings framework.

The rollers of each pair are peripherally arranged for imparting a corrugation or undulation to the filament, the upper roller being formed with a series of longitudinally curved, rib-like projections 85 and the lower roller formed with a series of corresponding depressions 86 or reversely. Both rollers 78 and 76 are heated by longitudinal heating elements or rods 87 electrically energized through contact rings 88 at one end of the rollers and connecting conductors 89 at the opposite ends of the rollers, though obviously any means for energizing the heating elements to insure a properly heated surface for the rolls is contemplated. Obviously, gas may be used for heating the rolls in lieu of electricity.

A spinning wheel 90 for the corrugated filament is arranged in advance of the corrugating rollers 74. The spinning wheel 90, shown more particularly in Figure 17, is mounted for free rotation on the shaft 37 supporting the spinning wheel 33 for the straight filament. The spinning wheel 90 is made up of end disks 91 connected together for unitary movement and connected by a circumferential series of freely rotatable hollow or solid rods 92 arranged immediately adjacent the periphery of the disk heads 91. The spinning wheel for the corrugated filament is necessarily provided with the independent hollow or solid rods 92, and these rods are so spaced apart circumferentially of the disk heads, and the rods themselves are of such diameter, as to more or less accurately accommodate the corrugations in the filament. That is to say, as the corrugated filament passes over the spinning wheel, the offset or rounded portions of the corrugations overlie and partly surround the rods 92, while the points of the corrugations rest between the rods or, if the corrugations are reversely formed, the rounded portions rest on the rounded surfaces of adjacent rollers, as illustrated more particularly in Figure 5.

Below the spinning wheel for the corrugated filament is a take-off roller 93, this roller being preferably mounted on the shaft 42 which supports the take-off roller 40 for the straight filament. The take-off roller 93 comprises disk heads 94 connected for unitary movement and provided with a circumferential series of hollow or solid rods 95 arranged adjacent the periphery of the disk heads and spaced to accommodate the corrugations of the corrugated filament in the manner described in connection with the spinning wheel 90.

Arranged beneath and in advance of the take-off roller are guide rollers 96 leading to a knife platform 97 preferably transversely aligned with the knife platform 46 and supported on the same framework. The knife platform 97 is formed with a longitudinal slot 98 and the framework is extended upwardly to provide guides 99 guidingly supporting a cross bar 100 and reciprocated by pitmen 101 operated by an eccentric 102 on a shaft 103 preferably aligned with the shaft 55 of the straight filament cutter. The bar 100 supports a knife 104 of peculiar type, in that its lower end is divided to present spaced cutting edges 105 and 106. The cutting edges of the knife 104 are spaced apart a distance approximating one-half the linear distance of a particular corrugation of a filament.

In advance of the cutter platform 97 is arranged a chute 107 leading to a conveyor made up of belts 108 provided with grippers 109 corresponding to the grippers 92 of the preferred form, with the rollers 110 of such grippers controlled by cam bar 111 corresponding to the cam bar 68 of the straight filament form. The space between the belts 108 of the corrugated filament conveyor is bridged by rods 112 corresponding to the rods 69 of the straight filament form, the particular feature of the rods 112 being that they are spaced apart in correspondence with the spacing of the rods of the spinning wheel and take-up roller, or in other words spaced to accommodate the corrugations of the filament. The rods 112 are moved laterally by a lever 113 connected to a frame carrying rods at one end by a link 114.

Thus it will be apparent that aside from the corrugating rolls and the particular arrangement of the hollow rods in the spinning wheel, take-up roller and conveyor, the parts of the device handling the corrugated filament are substantially a duplicate of the parts of the device handling the straight filament. In this particular, the cutting knife for the corrugated filament is necessarily provided with spaced cutting edges, while this detail need not necessarily be present in the knife for the straight filament.

In utilizing the apparatus for the corrugated filament, the operation described in connection with placing the straight filament on its spinning wheel is carried out. After the carriage has been moved out of the way and the filaments are attached to the straight filament spinning wheel 33, the upper or movable roll of each pair of corrugated rolls is raised relative to the lower roll of the pair to provide ample space between them. The furnace is then shifted bodily longitudinally of the track 26 until it is in line with the corrugated rolls 74. The spinning wheel with the straight filaments attached is turned over, and incident to the now angular relation of the filaments from the furnace, the filaments are gradually brought into contact with the corrugated filament spinning wheel 90 and caused to adhere to the transverse hollow rods 92 thereof. In this position, of course, the particular row of filaments in line with the space between the particular sets of corrugated rolls has passed between the rolls of such pairs and overlies the lower corrugating roll 76. The upper roll 78 of each corrugating pair is then lowered into substantial contact with the lower corrugating roll of the pair through proper operation of the screw 82 and the spinning wheel is started, the driving mechanism at the same time imparting the necessary movement to the corrugating rolls.

It is to be noted that the corrugating rolls are arranged closely adjacent the furnace, as will appear from Figure 1 of the drawings, so that the filaments delivered to the corrugating rolls have suffered little loss of temperature, or in other words are in such heated condition as to be readily subjected to the corrugating action of the rolls without breakage. As many corrugating rolls are brought into play as there are rows of filaments drawn from the furnace, and as the operation continues, the film passing between the respective pairs of corrugating rolls is corrugated in the shape substantially shown in Figure 23 of the drawings, though obviously other forms of convolutions or corrugations may be provided, if desired. The corrugated film passes over the spinning wheel, around the take-up roller, over the guide rolls, beneath the knife, and is initially gripped by the gripper of the corrugated conveyor and drawn upon, the parts being driven in synchronism and properly timed for this result.

When the corrugated film reaches a predetermined point under the movement of the conveyor, the knife 104 is actuated, and as this knife has spaced cutting points 105 and 106, it is, of course, apparent that a portion of each corrugated filament in the layer is bodily separated from the filament as a whole. This cut-out portion falls through the slot 98 and may be returned to the furnace when sufficient has accumulated. The purpose of bodily severing a portion of the corrugated filament is due to the fact that the corrugations of each layer of filament deposited on the support are designed to be offset with respect to the corrugations of the immediately preceding layer. Thus, if a portion of the corrugation is bodily cut from the filament, it is apparent that each filament, when gripped by the gripper of the conveyor, presents to that gripper a portion of a terminal corrugation differing from the similar end of a preceding layer by the distance between the cutting edges 105 and 106 of the cutter 104. If each layer of the corrugated filament is moved to the same point by the conveyor and discharged onto the support by lateral movement of the supporting rods, it is apparent that the corrugations of the filaments of each layer will be offset relative to the corrugations of the immediately preceding layer. That is to say, the corrugations of no two succeeding layers will be so aligned as to fit one within the other. The result is shown in Figure 23, and the obvious purpose is, by this relatively offset relation of the corrugations of succeeding layers, to provide the maximum area of dead air space in the body of the filament mass as finally provided. Of course, the greater the area of the dead air space, the more effective the insulating properties of the body or section formed by the spun glass filaments.

The mass of successive layers of the glass filaments, either of straight or corrugated form, when of appropriate thickness may be secured as a unit by fixing the edges by a cementitious material such, for example, as water glass and, if necessary, the respective layers may be stitched together at appropriate points by ordinary stitching operation and the use of long stitches.

The important characteristic of the present invention is the provision of a corrugated spun glass filament, and while the apparatus here shown is designed to produce either straight glass filaments or corrugated glass filaments at will, it is to be understood that from an apparatus standpoint, the invention is concerned more particularly with the production of the corrugated glass filaments and, therefore, this particular portion of the apparatus may, if desired, be used alone, in which event the carriage for initially withdrawing the filaments from the furnace and the parts of the apparatus having to do with straight glass filaments may be discarded. While it is unquestionably true that transference of the filaments from the straight filament spinning wheel to the corrugated filament spinning wheel may be readily accomplished, the connecting shield 115 may be provided between the wheels to insure ease of transfer, if desired.

I claim:—

1. In a method of producing spun glass threads, the step of subjecting the threads to a treatment to permanently change their outline form.

2. In a method of producing spun glass threads, the step of imparting a permanent wavy formation to the threads.

3. In a method of producing spun glass threads, the step of corrugating the threads.

4. A method of producing spun glass threads consisting in simultaneously withdrawing a plurality of threads from the molten mass, spinning the threads, severing the threads into predetermined lengths, and depositing the lengths of spun threads successively in superimposed relation.

5. An apparatus for spinning glass including a furnace, a carriage, a plurality of withdrawing elements carried by the carriage and each adapted to withdraw a filament of glass from the furnace, means whereby the carriage may be moved away from the furnace, and a spinning wheel on which the threads withdrawn may be deposited for spinning.

6. An apparatus for spinning threads including means to permit the passage of glass filaments from a source of molten glass supply, said means being arranged to corrugate the filaments during movement therethrough, a spinning wheel over which the corrugated filaments are passed, a cutter beneath which the corrugated filaments are passed, and a conveyor for moving the filaments beyond the cutter, said cutter being formed to bodily eliminate a section of a filament in the cutting operation to vary the relation of the successive filaments on the conveyor with respect to their corrugations.

7. An apparatus for producing spun glass filaments including a furnace, filament corrugating elements located adjacent the furnace between which the filaments pass, and a spinning wheel to which the filaments are initially secured, said spinning wheel having a filament-receiving surface formed of independently rotatable elements spaced apart in accordance with the corrugations in the filament.

8. An apparatus for producing spun glass filaments including a furnace mounted for movement, a carriage for selecting filaments from the furnace and moving the same beyond the furnace, a spinning wheel with which the filaments are additionally secured and over which they are passed in the spinning operation, a second spinning wheel mounted adjacent the first mentioned wheel, corrugating rollers adjacent the second spinning wheel, the movement of the furnace serving to deflect the filaments initially secured to the first spinning wheel to a position between the corrugating rollers and into engagement with the second spinning wheel.

9. An apparatus for producing spun glass filaments including a furnace mounted for movement, a carriage for selecting filaments from the furnace and moving the same beyond the furnace, a spinning wheel with which the filaments are additionally secured and over which they are passed in the spinning operation, a second spinning wheel mounted adjacent the first mentioned wheel, corrugating rollers adjacent the second spinning wheel, the movement of the furnace serving to deflect the filaments initially secured to the first spinning wheel to a position between the corrugating rollers and into engagement with the second spinning wheel, means beyond each spinning wheel for cutting the filaments, and means beyond each cutting means for withdrawing a predetermined length of filaments beyond the cutter.

10. An apparatus for spinning glass including a furnace including a melting tank and a spinning tank arranged for communication, the spinning tank being arranged wholly below the melting tank.

11. An apparatus for spinning glass including a furnace including a melting tank and a spinning tank arranged for controllable communication, the spinning tank being arranged wholly below the melting tank.

12. An apparatus for spinning glass including a furnace including a melting tank and a spinning tank arranged for controllable communication, and a spinning wheel with which the filaments from the spinning tank of the furnace are secured and over which they are passed in the spinning operation, the spinning tank being arranged wholly below the melting tank.

13. An apparatus for spinning glass including a furnace including a melting tank and a spinning tank arranged for controllable communication, a spinning wheel with which the filaments from the spinning tank of the furnace are secured and over which they are passed in the spinning operation, and means intermediate the spinning wheel and furnace for imparting a regular non-spread form to the filament.

14. An apparatus for spinning glass including a furnace including a melting tank and a spinning tank arranged for controllable communication, and a spinning wheel with which the filaments from the spinning tank of the furnace are secured and over which they are passed in the spinning operation, said spinning wheel having a filament receiving surface formed of spaced, independently rotatable elements.

15. An apparatus for spinning glass including a furnace including a melting tank and a spinning tank arranged for controllable communication, a spinning wheel with which the filaments from the spinning tank of the furnace are secured and over which they are passed in the spinning operation, a cutter beyond the spinning wheel and to which the filaments are delivered, and means beyond the cutter for depositing the severed filaments in layer sheet form.

16. An apparatus for producing spun glass filaments including a furnace, a spinning wheel to which the filaments may be delivered and over which they are passed in the spinning operation, a take-off roller to receive the filaments from the spinning wheel, a cutter beyond the take-off roller for automatically severing the filaments into selected lengths, and means beyond the cutter for moving the severed filaments to a predetermined position to permit their deposit in layers.

17. An apparatus for producing spun glass filaments comprising a furnace, a spinning wheel arranged beyond the furnace and having a surface formation of independently rotatable spaced elements, a take-off roller to receive the filaments from the spinning wheel, a cutter beyond the take-off roller for dividing the filaments into predetermined lengths, and a conveyor beyond the cutter for delivering the severed filaments to a predetermined position for subsequent deposit in layers.

18. An apparatus for producing spun glass filaments comprising a furnace, a spinning wheel arranged beyond the furnace and having a surface formation of independently rotatable spaced elements, a take-off roller to receive the filaments from the spinning wheel, a cutter beyond the take-off roller for dividing the filaments into predetermined lengths, a conveyor beyond the cutter for delivering the severed filaments to a predetermined position for subsequent deposit in layers, said conveyor including a platform onto which the filaments are drawn, and means for moving the platform laterally to dislodge the severed filaments for deposit beneath the conveyor.

19. An apparatus for producing spun glass filaments comprising a furnace, a spinning wheel arranged beyond the furnace and having a surface formation of independently rotatable spaced elements, a take-off roller to receive the filaments from the spinning wheel, a cutter beyond the take-off roller for dividing the filaments into predetermined lengths, and a conveyor beyond the cutter for delivering the severed filaments to a predetermined position for subsequent deposit in layers, the operation of the cutter and conveyor being synchronized for the delivery of filament lengths in identical positions for deposit.

20. An apparatus for producing spun glass filaments comprising a furnace, a spinning wheel arranged beyond the furnace and having a surface formation of independently rotatable spaced elements, a take-off roller to receive the filaments from the spinning wheel, a cutter beyond the take-off roller for dividing the filaments into predetermined lengths, a conveyor beyond the cutter for delivering the severed filaments to a predetermined position for subsequent deposit in layers, and grippers on the conveyor for engaging the free end of a filament length and moving the same a predetermined distance prior to the operation of the cutter.

HANS J. BLUM. [L. s.]